US011623386B2

(12) United States Patent
Milioti (10) Patent No.: US 11,623,386 B2
(45) Date of Patent: Apr. 11, 2023

(54) MACHINE AND METHOD FOR LAMINATING TWO FACES OF A PART (71) Applicant: ASIDIUM, Meyzieu (FR)

(72) Inventor: Stéphane Milioti, Meyzieu (FR)

(73) Assignee: ASIDIUM, Meyzieu (FR)

(*) Notice: Subject to any disclaimer, the term of this patent is extended or adjusted under 35 U.S.C. 154(b) by 0 days.

(21) Appl. No.: 17/257,631

(22) PCT Filed: Jul. 2, 2019

(86) PCT No.: PCT/FR2019/051629
§ 371 (c)(1),
(2) Date: Jan. 4, 2021

(87) PCT Pub. No.: WO2020/012089
PCT Pub. Date: Jan. 16, 2020

(65) Prior Publication Data
US 2021/0299940 A1    Sep. 30, 2021

(30) Foreign Application Priority Data

Jul. 11, 2018 (FR) ...................................... 18 56370

(51) Int. Cl.
B32B 41/00 (2006.01)
B29C 63/02 (2006.01)
(Continued)

(52) U.S. Cl.
CPC ........ *B29C 63/024* (2013.01); *B29C 63/0004* (2013.01); *B29L 2031/724* (2013.01); *B29L 2031/778* (2013.01)

(58) Field of Classification Search
CPC .............. B29C 63/024; B29C 63/0004; B29C 63/02; B29C 63/0056; B29L 2031/724; B29L 2031/778
(Continued)

(56) References Cited

U.S. PATENT DOCUMENTS 5,666,881 A * 9/1997 Zanoli ....................... B41F 5/20
101/477
9,186,876 B1 11/2015 Queck et al.
(Continued)

FOREIGN PATENT DOCUMENTS

DE    19925087 A1 * 12/2000 ............. B29C 63/02
EP    1 884 346       2/2008
(Continued)

Primary Examiner — Michael N Orlando
Assistant Examiner — Joshel Rivera
(74) Attorney, Agent, or Firm — Clark & Brody LP (57) ABSTRACT The subject of the invention relates to a laminating method consisting:
  in disposing in series on the horizontal path of a first face of the part, several first application units (Ua1, Ua2, . . . ) and in series on the horizontal path of the second face of the part, several second application units (Ub1, Ub2, . . . ) each positioned facing a first application unit located on the first face;
  in placing the first application units (Ua1, Ua2, . . . ) and the second application units (Ub1, Ub2, . . . ) in different vertical positions such that the combined application with overlapping of the protective films on each of the faces of the part corresponds to the height to be covered by the films;
  in applying, using the first application units and the second application units, the protective films respectively to the first face and to the second face of the part, starting from the front border of the surface to be covered;
  and in successively cutting out as a function of the horizontal path of the part the protective films at the level of the rear border of the surface.

8 Claims, 3 Drawing Sheets (51) Int. Cl.
*B29C 63/00* (2006.01)
*B29L 31/00* (2006.01)

(58) Field of Classification Search
USPC .................. 156/60, 64, 350, 351, 378, 379
See application file for complete search history.

(56) References Cited

U.S. PATENT DOCUMENTS

| | | | | |
|---|---|---|---|---|
| 2011/0265931 | A1* | 11/2011 | Sato | B30B 15/064 |
| | | | | 156/64 |
| 2015/0013914 | A1* | 1/2015 | Zacche' | B65C 9/1807 |
| | | | | 156/518 |
| 2016/0176171 | A1* | 6/2016 | Trpkovski | C03C 17/002 |
| | | | | 156/230 |
| 2020/0001586 | A1* | 1/2020 | Milioti | B32B 41/00 |

FOREIGN PATENT DOCUMENTS

| | | | | |
|---|---|---|---|---|
| FR | 2 852 553 | | 9/2004 | |
| FR | 3 053 662 | | 1/2018 | |
| WO | WO-2018145721 | A1 * | 8/2018 | ......... B29C 63/0043 |

* cited by examiner

MACHINE AND METHOD FOR LAMINATING TWO FACES OF A PART

The subject of the invention relates to the technical field of lamination with the aim of protecting with protective films, flat parts in the general sense moved along a horizontal path.

The subject of the invention has particularly advantageous applications in the field of the construction glass industry and particularly for protecting the glazing of doors and windows using a temporary protective film.

In the field of the construction glass industry, there is a need to protect panes of glass leaving the manufacturing line without altering productivity on the manufacturing line. The protection of panes with a film requires the film to be applied set back from its edges to avoid it being clamped between the pane and its backing since such a pane is intended to be fitted along its perimeter into a door or window leaf. Additionally, the technique for manufacturing panes leads to them being constantly manufactured with different dimensions. The lamination technique must therefore adapt to the different sizes of the panes. The lamination technique must therefore adapt to the different sizes of the windows. Finally, for space-saving reasons, the laminating machine must have limited bulk while being able to be incorporated into the method of vertical handling of panes leaving the manufacturing process.

To ensure the lamination of panes, the patent FR 2 852 553 has proposed a machine including a structure for the support and successive transfer of the panes to be protected, making it possible to make the panes travel past in the vertical position, in front of a film-applying assembly. This assembly comprises at least one shaft on which spools of films are mounted such that the leader of each film is then applied against one face of the pane during the transfer thereof. Certain of the spools can be adjusted in height to form on each pane, with the spool assembly, a sheetfed coating covering the intended surface of the pane. The leader of each film is held in position using a suction nozzle while each film is cut out using a heating film.

This patent describes the sheetfeeding application of films on only one face of the pane. The operation of laminating both faces of the pane by such a machine is therefore not optimized. Moreover, it appears that the holding of the film by suction does not make it possible to obtain the precise and correct positioning of the film on the pane.

In the technical field of the application of protective films, the patent application FR 3 053 662 describes an industrial machine for applying temporary or permanent protective films including a laminating module equipped with an applicator roller which laminates the protective film onto the part to be protected moved in translation. This applicator roller cooperates with an electrostatic charging bar allowing the film to adhere to the applicator roller. This laminating module also includes a cutting module intended to cut out the film in contact with the applicator roller.

This laminating module is moved by an actuator used to position the film carried by the applicator roller at the level of the front edge of the part. As a function of the position of the rear edge of the part, the cutting module cuts out the film, at the place on the film corresponding to the rear edge of the part. This machine is used to protect the part from one edge to the other with a film, without having any offcuts. Such a document does not describe the application of films on both faces of a part and making it possible to adapt to parts having different dimensions.

The aim of the present invention is to remedy the drawbacks of the prior art by proposing a method for protecting at the same time the two faces of one part with films, and designed to optimize the duration of the laminating operation while also ensuring the accurate and efficient positioning of the films on the part whatever the dimensions of the surface to be covered.

To achieve this objective, the subject of the invention relates to a method for laminating with protective films deposited using application units, on a first and a second face of a flat part moved along a horizontal path and each having a surface to be covered possessing a predetermined height to be covered determined between a lower edge and an upper edge of the part and a predetermined length to be covered determined between a front edge and a rear edge of the part and respectively delimited by a front border and a rear border.

According to the invention, the method consists:
  in disposing in series on the horizontal path of a first face of the part, several first application units and in series on the horizontal path of the second face of the part, several second application units each positioned facing a first application unit located on the first face;
  in placing the first application units and the second application units in different vertical positions such that the combined application with overlapping of the protective films on each of the faces of the part corresponds to the height to be covered;
  in gradually applying as the part travels along the horizontal path, using the first application units and the second application units, the protective films respectively to the first face and to the second face of the part, starting from the front border of the surface to be covered and over the length of the surface to be covered to provide the simultaneous lamination of the two faces of the part;
  and in successively cutting out as a function of the horizontal path of the part, using the first and second application units, the protective films at the level of the rear border of the length to be covered.

In addition, the method according to the invention can implement in combination at least one and/or the other of the following additional features:
  in disposing, for each application unit, a drum for applying a film and in positioning each application drum of a first unit facing an application drum of a second unit;
  in gradually applying as the part travels along the horizontal path, using the application units, the protective films to the face of the part, starting from the front border separated from the front edge of the part, by a margin;
  in successively cutting out as a function of the horizontal path of the part, using the application units, the protective films at the level of the rear border separated from the rear edge of the part, by a margin;
  in ensuring the movement of the part along the horizontal path using various systems of pairs of rollers disposed on either side of the part and positioned upstream of each application unit and downstream of the last application unit placed on the horizontal path of the part;
  in holding, by electrostatic charge, each film in contact with an application drum after its cutting-out and until its application to the part.

Another subject of the invention is to propose a machine for protecting the two faces of one part by films, designed to optimize the duration of the laminating operation while ensuring the accurate and efficient positioning of the films on the part whatever the dimensions of the surface to be covered.

According to the invention, the machine includes:
- a system for conveying a part to be laminated, in a vertical standing position along a horizontal path;
- several first film application units disposed in series on the horizontal path of a first face of the part and each being vertically moved by a driving member, each first application unit including at least one drum for applying a film moved toward and away from the part by a motor-driven laminating member, a cutting module being mounted to cut out the film positioned on the drum;
- several second film application units disposed in series on the horizontal path of the second face of the part, each positioned facing a first application unit located on the first face, each second application unit being vertically moved by a driving member and including at least one drum for applying a film moved toward and away from the part by a motor-driven laminating member, a cutting module being mounted for cutting out the film positioned on the drum;
- a system for detecting the positions of the front edge, the rear edge and the upper edge of the part with respect to the application drums;
- a computing and controlling unit linked to the conveying system, the detecting system, the driving members for moving the drums, and the cutting modules, this unit determining as a function of the height of the surface of the part to be covered and of the widths of the films, the vertical position of the drums for applying the protective films, this unit being designed for controlling the driving members of the drums to place the drums in vertical positions such that the combined application with overlapping of the protective films on each of the faces of the part corresponds to the height of the surface to be covered, the unit consecutively controlling, as a function of the position of the front edge of the part, the motor-driven laminating members, gradually as the part moves along the horizontal path, in such a way as to simultaneously apply the protective films to each face of the part, starting from the front border of the surface to be covered, the unit consecutively controlling, as a function of the position of the rear edge of the part, the cutting modules, gradually as the part moves along the horizontal path, in order to cut out the protective films at the level of the rear border of the surface to be covered.

In addition, the machine according to the invention can further include in a combination at least one and/or the other of the following additional features:
- take-up systems particularly including various systems of pairs of rollers disposed on either side of the part and positioned upstream of each pair of application units and downstream of the last pair of application units placed on the horizontal path of the part;
- each application unit includes in association with each application drum, an electrostatic charging bar controlled to hold each film in contact with an application drum after its cutting-out and until its application to the part;
- for at least one pair of application units disposed facing one another, a locking system for transversally locking a drum in the position of application of a film.

Various other features will become apparent from the description given below with reference to the appended drawings showing, by way of non-limiting examples, forms of embodiment of the subject of the invention.

As is apparent from the Figures, the subject of the invention relates to a laminating machine 1 in accordance with the invention including a supporting and transferring frame 2 for flat parts 3 such as panes in the general sense. This machine 1 includes a system 4 for conveying parts 3, in an upright standing position along a horizontal path shown by the arrow F. In practice, the parts 3 are inclined backward by an angle in the order of 6° with respect to the vertical.

Figure 1:
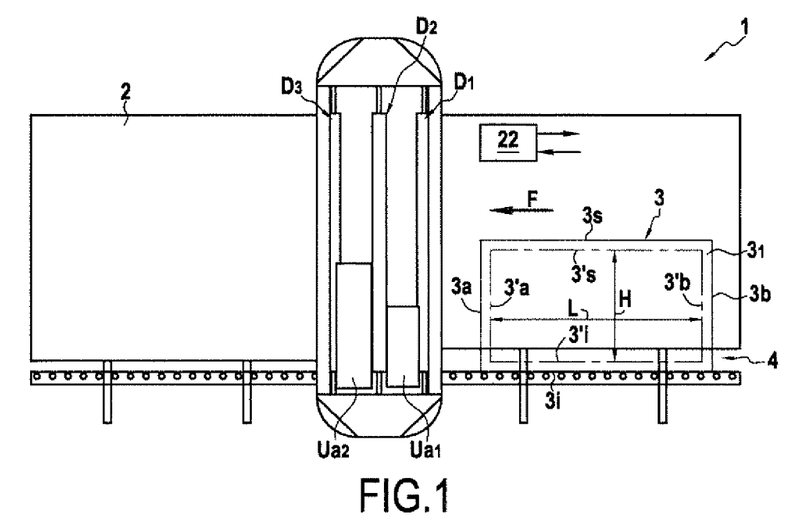
FIG. 1 is an elevation view of an exemplary embodiment of an application machine in accordance with the invention.

As is apparent more specifically from FIG. 1, each flat part 3 has a first so-called front face $3_1$ and a second so-called rear face $3_2$ and possesses in consideration of the standing conveying position, a lower edge $3i$, an upper edge $3s$, a front edge $3a$ and a rear edge $3b$ in consideration of the direction of conveying of the part. Each face of the part 3 has a surface to be covered by the films, possessing on the one hand a predetermined height H delimited between the lower edge $3i$ and the upper edge $3s$ of the part and on the other hand, a predetermined length L between the front edge $3a$ and the rear edge $3b$. This surface to be covered is thus delimited by front $3'a$, rear $3'b$, lower $3'i$ and upper $3'$'s borders extending in relation to the front, rear, lower and upper edges of the part respectively. According to an advantageous variant embodiment for which the part is a door or window pane, the height H and the length L of the surface to be covered by the film are respectively less than the height and the width of the part, allowing to remain, on the periphery of the part, a margin not covered by the films and intended to be fitted into the door or window leaf. Of course, the subject of the invention allows for the application of the films without a margin with respect to the edges of the part.

The conveying system 4 moves in translation the parts 3 supported by their lower edge $3i$ along a reference plane, in such a way as to successively bring the parts to face the film application units mounted in a fixed manner with respect to the translational movement of the parts.

Figure 2:
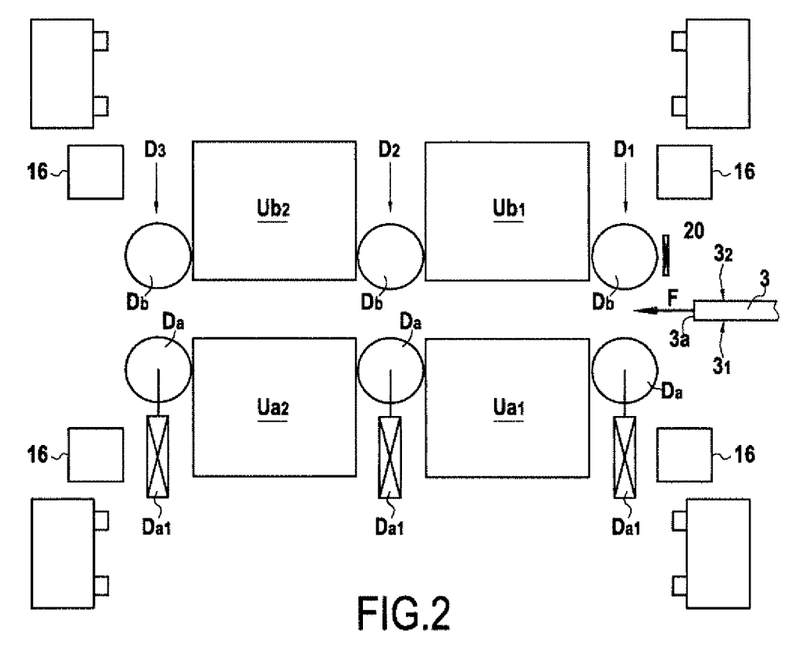
FIG. 2 is a schematic top view showing the configuration of an application machine in accordance with the invention.

In accordance with the invention, this laminating machine 1 includes several first film application units Ua1, Ua2, . . . disposed in series on the horizontal path of the first face $3i$ of the part. The first so-called front application units Ua1, Ua2, . . . are two in number in the illustrated example but the machine can include a greater number of film application units. In consideration of the direction of travel of the parts, the first application units are denoted Ua1 and Ua2.

In accordance with the invention, this laminating machine 1 also includes several second film application units Ub1, Ub2, . . . disposed in series on the horizontal path of the second face $3_2$ of the part. Each second film application unit is positioned facing a first application unit located on the first face. The second so-called rear application units Ub1, Ub2, . . . are two in number in the illustrated example but the machine can include a greater number of film application units. In consideration of the direction of travel of the parts, the second application units are denoted Ub1 and Ub2. As is apparent from FIG. 2, the machine 1 includes pairs of application units and in the illustrated example, in consideration of the path of the part, a first pair of application units Ua1-Ub1 and a second pair of application units Ua2-Ub2. Each of these pairs is formed by a front application unit and a rear application unit, the pairs being successively disposed on the path of the part. The application units of one and the same pair operate symmetrically for the application of the films to the first face $3_1$ and to the second face $3_2$. In other words, the front and rear application units of one and the same pair perform identical operations in such a way that the stresses imposed on the part are symmetrical.

The machine 1 includes systems D1, D2, D3 for taking up the parts, positioned upstream of each pair of application unit and downstream of the last pair of application units placed on the path of the part. In the exemplary embodiment illustrated in the drawings, the machine 1 includes three take-up systems namely in consideration of the path of the part 3, a first so-called introducing D1, a second so-called intermediate D2 and a third so-called ejecting D3 take-up system.

Each take-up system D1, D2, D3 includes a pair of rollers Da, Db disposed on either side of the part 3. One of the rollers for example Da is mounted transversally movable with respect to the path of the part by an actuator Da1 and with respect to the other roller Db mounted fixed but driven in rotation by a motor, not shown. The pair of rollers placed upstream of each pair of application units thus ensures the introduction of the part into the application units located downstream. The pair of rollers placed downstream of the last pair of application units (Ua2-Ub2 in the example) placed on the path of the part 3 thus provides ensures the ejection of the part from the upstream application units.

Figure 3:
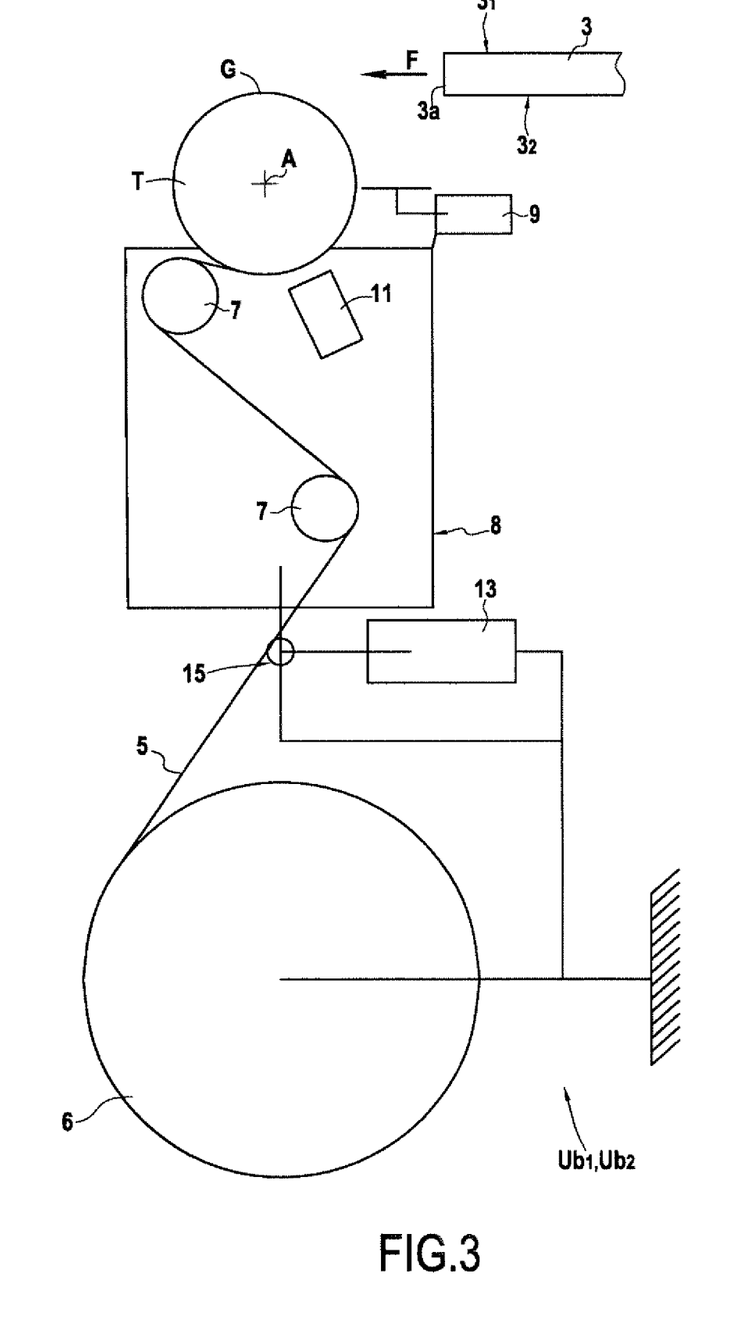
FIG. 3 is a view of an exemplary embodiment of a so-called rear application unit forming part of an application machine in accordance with the invention.
Figure 4:
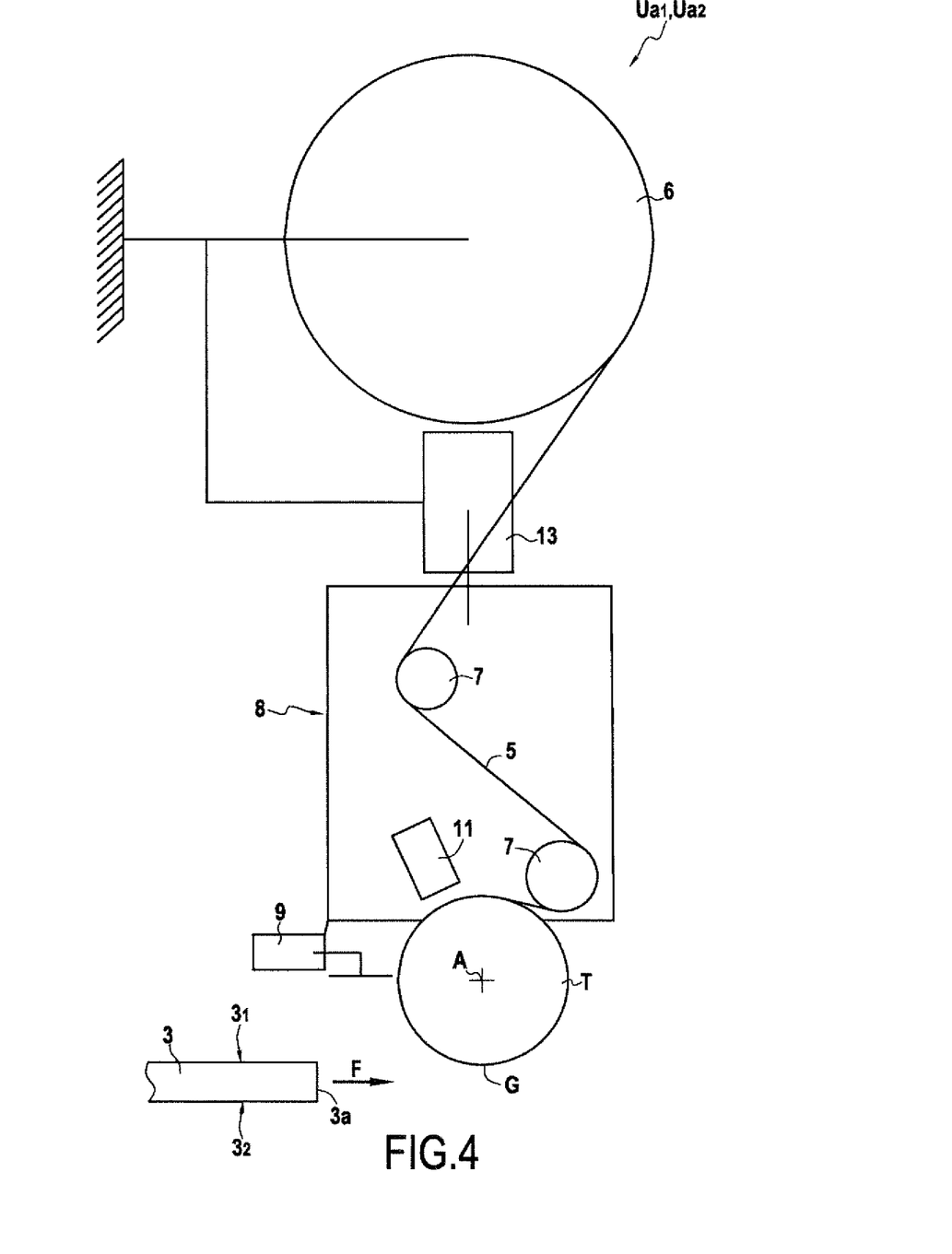
FIG. 4 is a view of an exemplary embodiment of a so-called front application unit forming part of an application machine in accordance with the invention.

Each application unit Ua1, Ua2, Ub1 and Ub2 particularly includes a drum T for applying a film 5 coming from a fixed spool 6 and co-operating with counter-rollers 7 to optimize its contact with the application drum. Each application drum T is positioned in such a way that its axis of rotation A is parallel to the faces of the part. Each application drum T is supported by a movable head 8 provided with a cutting module 9 mounted for cutting out the film positioned on the drum. Typically, each cutting module 9 advantageously includes a cutting blade movable according to a generatrix of the application drum and cutting the film in contact with the application drum T. Each movable head 8 is equipped with an electrostatic charging bar 11 linked to an electrostatic charge generator and controlled to hold each film in contact with the application drum after its cutting-out and until its application to the part.

Each application drum T is moved toward and away from the part 3, using a motor-driven laminating member 13. More precisely, each motor-driven laminating member 13 is mounted to act on the movable head 8 particularly supporting an application drum T. The motor-driven laminating members 13 each belonging to pairs of application units are controlled in such a way that each pair of drums T placed opposite, occupy either a moved-toward position for lamination or film-coating of the part or a moved-away position for introduction of the part. The application drums of each pair of application units are positioned symmetrically on either side of the faces of the part 3 in order to balance the pressures exerted on the part.

According to an advantageous embodiment feature, the machine 1 includes for at least one pair of application units Ua1-Ub1, Ua2-Ub2 disposed facing one another, a locking system 15 for transversally locking a drum T in the position of application of a film. As is apparent more specifically from FIG. 3, each rear application unit Ub1, Ub2 includes a locking system 15 of snap fastening type used to lock in the fixed transverse position the drum T of each rear application unit. The drum of each application unit gives the pair of drums a reference position. Each drum of a front application unit Ua1, Ua2 is moved by an actuator including a pressure regulation. The drum of the application unit is in position when the setpoint pressure is reached, this pressure value adapting to the thickness of the part 3.

According to a feature of the invention, each application unit Ua1, Ua2, Ub1, and Ub2 is mounted vertically movable using a driving member 16 such as a motor-driven ball screw. Thus, the application drums T of one and the same series of application units can be placed in different vertical positions such as the combined application with overlapping of protective films on one face of the part corresponding to the height H of the surface to be covered. Of course, the cumulative height of the heights of the films equipping the two application drums belonging to one and the same series of application units is greater than the height H of the surface to be covered. The degree of overlap of the two films depends on the difference between the cumulative height of the films and the height H of the surface to be covered.

According to a feature of the invention, the machine includes a system 20 for detecting the positions of the front edge 3a, the rear edge 3b and the upper edge 3s of the part with respect to the application drums T. This detecting system 20 implements various position sensors, suitable for allowing the correct positioning of the films on the faces of the part at the level of the surface to be covered.

According to another feature of the invention, the machine 1 includes a computing and controlling unit 22 used to control the component elements of the machine used to provide the operation of film-coating each part. This computing and controlling unit 22 is executed in any appropriate way such as in the form of a programmable automaton or a computer. This computing and controlling unit 22 is linked to the conveying system 4, the detecting system 20, the members 16 driving the vertical movement of the application units, the motor-driven laminating members 13 and the cutting modules 9.

This computing and controlling unit 22 receives the information about the height of the films equipping the application drums T as well as the margin defined for each part 3 between the edges of the part and the surface to be covered. These items of information are provided to this unit 22 by a human-machine interface or following the reading of an encoded item of information about the part. This computing and controlling unit 22 which detects the position of the edges of the part and knows the margin for each part 3 is able to determine the position of the borders from the surface to be covered.

The computing and controlling unit 22 knows the height of the part 3 via the detecting system 20. Note that the height of the part can be detected by detecting only the position of the upper edge 3s of the part insofar as the lower edge 3i always occupies the same position supported by the conveying system 4.

The computing and controlling unit 22 determines as a function of the height of the part 3, of the margin for the surface of the part to be covered and of the widths of the films 5, the vertical position of the drums for applying the protective films belonging to each of the series in such a way that the combined application with overlapping of the protective films on each of the faces of the part corresponds to the height to be covered. Thus, the computing and controlling unit 22 controls the driving members 16 of the drums T to place the drums in vertical positions such that the combined application with overlapping of the protective films on each of the faces of the part corresponds to the height H to be covered.

The computing and controlling unit 22 consecutively controls, as a function of the position of the front edge 3a of the part, the motor-driven laminating members 13, gradually as the part 3 travels along the horizontal path, in such a way as to apply the protective films to each face of the part, starting from the front border 3"a of the surface to be covered.

The computing and controlling unit 22 consecutively controls, as a function of the position of the rear edge 3b of the part, the cutting members 9, gradually as the part 3 travels along the horizontal path, in order to cut out the protective films at the level of the rear border 3'b of the surface to be covered.

The machine 1 described above further makes it possible to implement an automatic process of laminating on a line the two faces of parts 3 having varying heights and lengths.

Each part 3 is moved in translation by the conveying system 4, the front edge 3a of which is detected by the detecting system 20 located upstream of the take-up system D1 placed upstream of the first pair of application units and called introducing take-up system. The actuator Dal of this introducing take-up system D1 is controlled to obtain the closing of the pair of rollers Da, Db of this system to ensure the translation of the part 3 and bring it to the first pair of application units namely Ua1-Ub1.

Moreover, it should be noted that the computing and controlling unit 22 is suitable for positioning the application units Ua1-Ub1 of the first pair in order to comply with the height H of the surface of the part to be covered. The margin with the lower edge 3i of the plate being known, the driving members 16 of the application units Ua1-Ub1 of the first pair are controlled to place the application drums T of this first pair in such a way that the lower edges of the films are found positioned at the level of the lower borders 3'i of the surface to be covered.

As a function of the detection of the front edge 3a of the part, the motor-driven laminating members 13 of the application units Ua1-Ub1 of the first pair are controlled at the same time to place the application drums T of this first pair in such a way that the films supported on the drums are found positioned on the first face and on the second face of the part, at the level of the front border 3'a of the surface to be covered. As will be understood from the remainder of the description, each film adheres to the application drum T up to its generatrix located as close as possible to the part i.e. the generatrix located in the plane passing through the axis of rotation A of the application drum and perpendicular to the path of the part 3. This generatrix is called the application generatrix G in the remainder of the description.

The simultaneous lamination of the two faces $3_1$, $3_2$ of the part by the application drums T is then done following the advancing of the part 3. The arrival of the front edge 3a of the part upstream of the second pair of application units Ua2-Ub2 is detected by the detecting system 20 located upstream of the take-up system D2 placed upstream of the second pair of application units and called intermediate take-up system. The actuator Dal of this intermediate take-up system D2 is controlled to obtain the closing of the pair of rollers Da, Db of this system to ensure the translation of the part 3 and bring it to the second pair of application units namely Ua2-Ub2.

It should be noted that the computing and controlling unit 22 is suitable for positioning the application units Ua2-Ub2 of the second pair in order to comply with the height H of the surface of the part to be covered. The margin with the upper edge 3s of the plate being known, the driving members 16 of the application units Ua2-Ub2 of the second pair are controlled to place the application drums T of this second pair in such a way that the upper edges of the films are found positioned at the level of the upper borders 3's of the surface to be covered.

As a function of the detection of the front edge 3a of the part, the motor-driven laminating members 13 of the application units Ua2-Ub2 of the second pair are controlled at the same time to place the application drums T of this second pair in such a way that the films 5 supported by the drums are found positioned on the first face 3i and on the second face $3_2$ of the part, at the level of the front border 3'a of the surface to be covered. It is recalled that each film adheres to the application drum T up to its generatrix G located as near as possible to the part i.e. the generatrix located in the plane passing through the axis of rotation A of the application drum and perpendicular to the path of the part 3.

The simultaneous laminating of the two faces of the part 3 by the films 5 of the application drums T of the second pair of application units Ua2-Ub2 is done following the part 3 as it advances.

When the part moves 3, the front edge 3a of the part 3 is detected by the detecting system 20 located upstream of the take-up system D3 placed downstream of the second pair of application units Ua2-Ub2. This so-called ejecting take-up system D3 is controlled to make the part advance until it exits the second pair of application units. The actuator Dal of this ejecting take-up system D3 is controlled to obtain the closing of the pair of rollers Da, Db of this system to ensure the translation of the part 3 and cause it to exit from the second pair of application units Ua2-Ub2.

When the part 3 moves, the rear edge 3b of the part 3 is detected by the detecting system 20 located upstream of the introducing take-up system D1 placed upstream of the first pair of application units Ua1-Ub1. This introducing take-up system D1 is controlled to make the part advance in a fixed predetermined position wherein will take place the cutting of the films supported by the application drums of the first pair of application units Ua1-Ub1. When the part 3 occupies this position, the movement of the part is stopped. The introducing take-up system D1 and the intermediate take-up system D2, or even the ejecting take-up system D3 are stopped.

In this position, the part 3 is placed in a position such that the distance between the rear border 3'b of the surface to be covered and the application generatrix G is equal to the perimeter of the application drum T caught between this application generatrix G and the generatrix along which the cutting blade of the cutting module 9 acts. Thus, when the part 3 continues its movement, the laminating operation will finish with the part of the film cut out on the application drum T, the end of which will then be positioned at the level of the rear border 3'b of the surface to be covered i.e. set back from the rear edge 3b by the desired margin.

To do this, the computing and controlling unit 22 controls the activation of the electrostatic charging bar 11 of each application drum of this first pair of application units Ua1-Ub1 to hold each film 5 in contact with its application drum. Each cutting module 9 of this first pair of application units Ua1-Ub1 is also controlled by the unit 22, to cut the films in contact with the drums. After cutting out the film, the film remains in contact with the application drum T owing to the activation of the electrostatic charging bar 11.

After the cutting-out of the films, the movement of the part 3 resumes. The introducing take-up system D1, the intermediate take-up system D2 and even the ejecting take-up system D3 are started again. The movement of the part 3 makes it possible to finish the laminating operation by the application units Ua1-Ub1 of the first pair. The drums T of the application units Ua1-Ub1 of the first pair are moved away by the laminating motor-driven members 13 and the electrostatic charging bars 11 are deactivated.

When the part moves, the rear edge 3b of the part 3 is detected by the detecting system 20 before its arrival at the second pair of application units Ua2-Ub2. The intermediate D2 and ejecting D3 take-up systems are controlled to make the part advance in a fixed predetermined position wherein will take place the cutting out of the films supported by the application drums T of the second pair of application units Ua2-Ub2. When the part 3 occupies this position, the movement of the part is stopped. The ejecting take-up system D3 and the intermediate take-up system D2 are stopped.

In this position, the part 3 is placed in a position such that the distance between the rear border 3'b of the surface to be covered and the application generatrix G is equal to the perimeter of the application drum T caught between this application generatrix G and the generatrix of the drum along which the blade of the cutting module 9 acts. Thus, when the part 3 continues its movement, the laminating operation will finish with the part of the film cut out on the application drum T, the end of which will then be positioned at the level of the rear border 3'b of the surface to be covered i.e. set back from the rear edge by the desired margin.

The electrostatic charging bar 11 of each application drum T of this second pair of application units Ua2-Ub2 is controlled to drive each film 5 in contact with its application drum and each cutting module 9 of this second pair of application units Ua2-Ub2 is controlled to cut the films in contact with the drums.

After the cutting-out of the films 5, the movement of the part 3 resumes. The ejecting take-up system D3 and the intermediate take-up system D2 are started again. The movement of the part 3 makes it possible to finish the laminating operation by the application units Ua2-Ub2 of the second pair. The drums T of the application units Ua2-Ub2 of the second pair are moved away by the laminating motor-driven members 13 and the electrostatic charging bars 11 are deactivated. The ejecting take-up system D3 is stopped after the complete evacuation of the part from the second pair of application units Ua2-Ub2. A laminating method for another part 3 can begin.

From the preceding description it is apparent that the laminating method according to the invention consists:
in disposing in series on the horizontal path of the first face of the part, several first application units Ua1, Ua2, . . . and in series on the horizontal path of the second face $3_2$ of the part, several second application units Ub1, Ub2, . . . each positioned facing a first application unit located on the first face;
in placing the first application units Ua1, Ua2, . . . and the second application units Ub1, Ub2, . . . in different vertical positions such that the combined application with overlapping of the protective films 5 on each of the faces of the part corresponds to the height to be covered;
in gradually applying as the part moves along the horizontal path, using the first application units and the second application units, the protective films respectively to the first face and to the second face of the part, starting from the front border 3'a of the surface to be covered and over the length to be covered;
and in successively cutting out as a function of the horizontal path of the part, using the first and second application units, the protective films at the level of the rear border 3'b of the surface to be covered.

The method according to the invention makes it possible to apply gradually as the part 3 moves along the horizontal path, using the application units, the protective films 5 to the face of the part, starting from the front border 3'a separated from the front edge 3a of the part, by a margin. Similarly, the method according to the invention makes it possible to successively cut out as a function of the horizontal path of the part 3, using the application units, the protective films at the level of the rear border 3'b separated from the rear edge 3b of the part, by a margin.

The invention is not limited to the examples described and shown as various modifications can be made thereto without departing from its scope.

The invention claimed is:

1. A method for laminating with protective films (5) deposited using application units, on a first ($3_1$) and a second ($3_2$) face of a flat part (3) moved along a horizontal path and each having a surface to be covered possessing a predetermined height to be covered determined between a lower edge (3i) and an upper edge (3s) of the part and a predetermined length (L) to be covered determined between a front edge (3a) and a rear edge (3b) of the part and respectively delimited by a front border (3'a) and a rear border (3'b), the method comprising:
disposing in series on the horizontal path of a first face of the part, several first application units (Ua1, Ua2, . . . ), each including a drum (T) having an application generatrix (G) and a cutting blade cutting the film in contact with the application drum (T) upstream of the generatrix (G), and in series on the horizontal path of the second face of the part, several second application units (Ub1, Ub2, . . . ), each including a drum (T) having an application generatrix (G) and a cutting blade cutting the film in contact with the application drum (T) upstream of the generatrix (G), each second application unit positioned facing a first application unit located on the first face in such a way that each drum (T) of a first application unit faces a drum of a second application unit, and ensuring that, on each drum (T), a protective film adheres up to the application generatrix (G) thereof;
detecting the height to be covered on each of the faces of the part (3);
placing the first application units (Ua1, Ua2, . . . ) and the second application units (Ub1, Ub2, . . . ) in different vertical positions such that the combined application with overlapping of the protective films on each of the faces of the part corresponds to the height to be covered;
gradually applying as the part travels along the horizontal path, using the first application units and the second application units, the protective films respectively to the first face and to the second face of the part, starting from the front border (3'a) of the surface to be covered and over the length of the surface to be covered to provide the simultaneous lamination of the two faces of the part;
and successively cutting out as a function of the horizontal path of the part, using the first and second application units, the protective films at the level of the rear border of the length to be covered in such a way that after the cutting-out of the protective film, the protective film adheres up to the application generatrix (G) on each drum (T).

2. The method as claimed in claim 1, further comprising:
gradually applying as the part travels along the horizontal path, using the application units, the protective films to the face of the part, starting from the front border (3'a) separated from the front edge (3a) of the part, by a margin;
and successively cutting out as a function of the horizontal path of the part, using the application units, the protective films at the level of the rear border (3'b) separated from the rear edge (3b) of the part, by a margin.

3. The method as claimed in claim 1, further comprising ensuring the movement of the part along the horizontal path using various systems (D1, D2, D3) of pairs of rollers disposed on either side of the part and positioned upstream of each application unit and downstream of the last application unit placed on the horizontal path of the part.

4. The method as claimed in claim 1, further comprising holding, by electrostatic charge, each film (5) in contact with an application drum after its cutting-out and until its application to the part.

5. A machine for laminating a flat part (3) moved along a horizontal path and having on a first and a second face a surface to be covered possessing a predetermined height (H) to be covered determined between a lower edge (3i) and an upper edge (3s) of the part and a predetermined length L to be covered determined between a front edge (3a) and a rear edge (3b) of the part and respectively delimited by a front border (3'a) and a rear border (3'b), the machine including:
a system (4) for conveying a part to be laminated, in a vertical standing position along a horizontal path;
several first film application units (Ua1, Ua2, . . . ) disposed in series on the horizontal path of a first face of the part and each being vertically moved by a driving member (16), each first application unit including at least one drum (T) for applying a film and having an application generatrix (G), the at least one drum (T) moved toward and away from the part by a motor-driven laminating member (13), a cutting module (9) being mounted to cut out the film positioned on the drum upstream of the application generatrix (G);
several second film application units (Ub1, Ub2, . . . ) disposed in series on the horizontal path of the second face of the part, each positioned facing a first application unit located on the first face, each second application unit being vertically moved by a driving member (16) and including at least one drum (T) for applying a film and having an application generatrix (G), the at least one drum (T) moved toward and away from the part by a motor-driven laminating member (13), a cutting module (9) being mounted for cutting out the film positioned on the drum upstream of the application generatrix (G);
a system (20) for detecting the positions of the front edge (3a), the rear edge (3b) and the upper edge (3s) of the part with respect to the application drums (T) and for detecting the height to be covered on each of the faces of the part (3);
a computing and controlling unit (22) linked to the conveying system (4), the detecting system (20), the driving members (16) for moving the drums (T), and the cutting modules (9), this unit (22) determining as a function of the height (H) of the surface of the part to be covered and of the widths of the films, the vertical position of the drums (T) for applying the protective films, this unit (22) being designed for:
controlling the driving members (16) of the drums to place the drums in vertical positions such that the combined application with overlapping of the protective films on each of the faces of the part corresponds to the height of the surface (H) to be covered;
consecutively controlling, as a function of the position of the front edge (3a) of the part, the motor-driven laminating members (13), gradually as the part moves along the horizontal path, in such a way as to simultaneously apply the protective films to each face of the part, starting from the front border (3'a) of the surface to be covered;
consecutively controlling, as a function of the position of the rear edge (3b) of the part, the cutting modules (9), gradually as the part moves along the horizontal path, in order to cut out the protective films at the level of the rear border (3'b) of the surface to be covered in such a way that after the cutting-out of the protective film, the protective film adheres up to the application generatrix (G) on each drum (T).

6. The machine as claimed in claim 5, characterized in that it includes take-up systems (D1, D2, D3) including various systems of pairs of rollers disposed on either side of the part and positioned upstream of each pair of application units and downstream of the last pair of application units placed on the horizontal path of the part.

7. The machine as claimed in claim 5, characterized in that each application unit includes in association with each application drum (T), an electrostatic charging bar (11) controlled to hold each film in contact with an application drum after its cutting-out and until its application to the part.

8. The machine as claimed in claim 5, characterized in that it includes for at least one pair of application units disposed facing one another, a locking system (15) for transversally locking a drum in the position of application of a film.

* * * * *